United States Patent [19]
Johnson et al.

[11] 4,454,994
[45] Jun. 19, 1984

[54] LOAD BEARING SURFACE

[76] Inventors: Louis W. Johnson; Bruce G. Johnson, both of 2435 Prairie Rd., Eugene, Oreg. 97402

[21] Appl. No.: 345,733

[22] Filed: Feb. 4, 1982

[51] Int. Cl.³ .............................................. B02C 2/04
[52] U.S. Cl. .................................... 241/215; 241/216
[58] Field of Search ................................ 241/207–216; 308/241, 243, 245, 3.5, 5 R, 78.1, 183, 187

[56] References Cited

U.S. PATENT DOCUMENTS

| | | | |
|---|---|---|---|
| 1,575,874 | 3/1926 | Symons | 241/215 |
| 4,192,472 | 3/1980 | Johnson . | |

FOREIGN PATENT DOCUMENTS

| | | | |
|---|---|---|---|
| 432848 | 8/1935 | United Kingdom | 241/216 |
| 757487 | 9/1956 | United Kingdom . | |
| 1260960 | 1/1972 | United Kingdom . | |

Primary Examiner—Mark Rosenbaum
Attorney, Agent, or Firm—Eugene M. Eckelman

[57] ABSTRACT

A base member has a face surface arranged to face a load receiving member. A plurality of grooves are provided in the face surface and bearing inserts are supported in these grooves. Such inserts project beyond the grooves and terminate in end bearing surfaces arranged to be engaged by the load receiving member. Lubrication inlets comprise cross grooves communicating with the insert receiving grooves whereby to supply lubrication under pressure to the area between the inserts. The system is associated with a high pressure source whereby oil is arranged to be forced over the end bearing surfaces of the inserts to provide a hydrostatic support for the loading receiving member. A water cooling passageway is provided in the base member.

12 Claims, 8 Drawing Figures

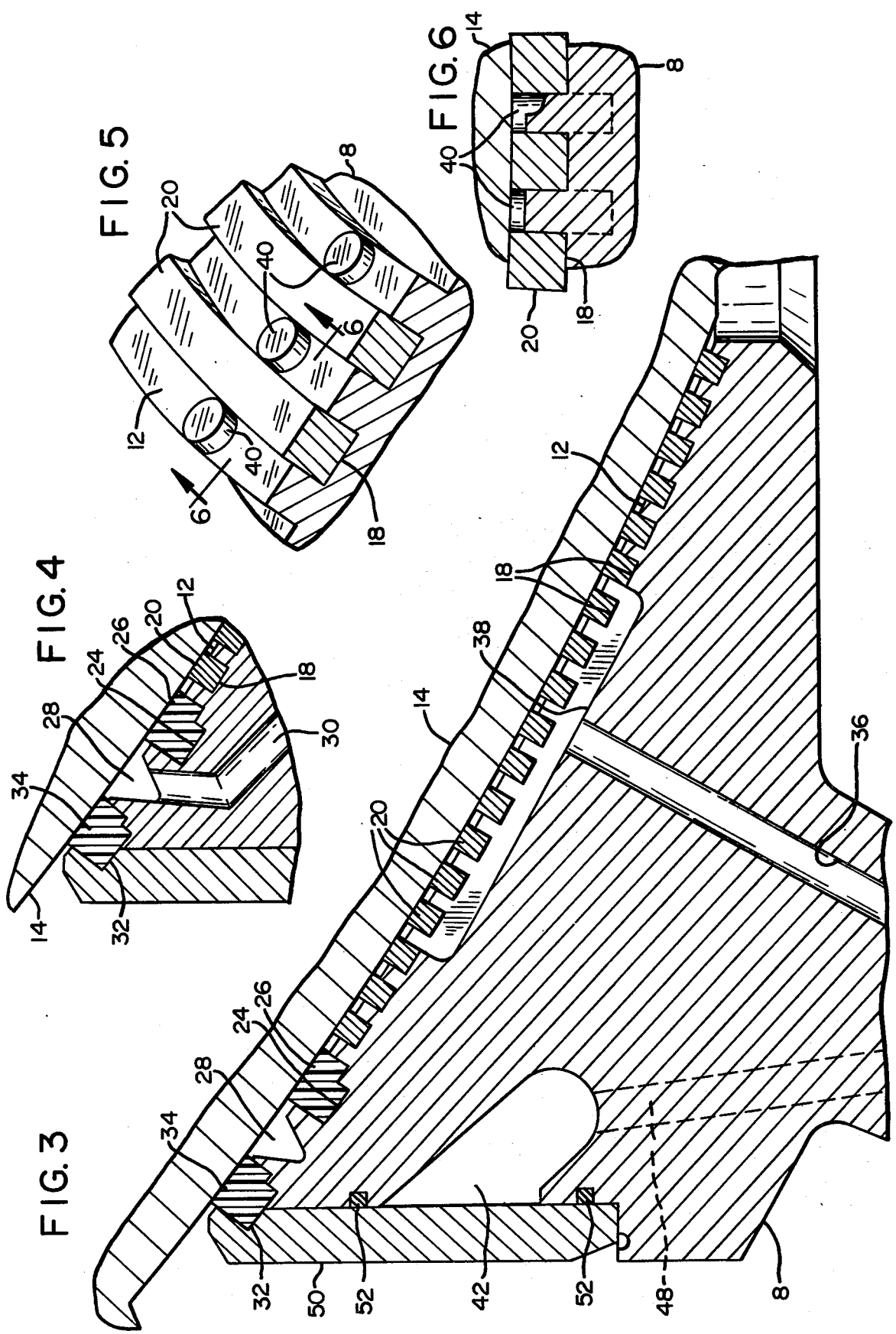

LOAD BEARING SURFACE

BACKGROUND OF THE IVNENTION

This invention relates to new and useful improvements in load bearing surfaces.

Many bearing surfaces are subject to high pressures for supporting heavily loaded movable members and thus require effective lubrication in order to maintain them in operating order for a reasonable time or work span before replacing or renewing them. Examples of high pressure bearing surfaces are those used in gyratory rock crushers wherein the base frame includes a supporting seat for a gyrating head. Due to the extremely high pressures on the bearing surface, hydrodynamic oil films are easily crushed and broken down which of course results in metal to metal contact and subsequent damage to the cooperating members. In order to overcome such damage, hydrostatic lubrication has been employed with some success but in view of the massive surface area of many bearing surfaces and the high pressures, such again as the gyratory rock crusher, it has been difficult to achieve highly efficient hydrostatic lubrication and furthermore it has been extremely costly to renew the bearing seat.

SUMMARY OF THE INVENTION

According to the present invention and forming a primary objective thereof, an improved load bearing surface is provided which achieves highly efficient hydrostatic as well as hydrodynamic lubrication and furthermore is relatively inexpensive to manufacture and also relatively inexpensive to renew after wear.

In carrying out the invention, a plurality of grooves are cut or otherwise provided in the load bearing surface and rugged type inserts, such as bronze inserts, are mounted in the grooves. These inserts have a thickness which is greater than the depth of the grooves whereby the projecting portion of them is engaged by the load receiving member. Pressured lubrication means is provided to admit lubricating oil to the bearing surfaces at a pressure sufficient to overcome a load on the bearing surfaces of the inserts and move lubricating oil over such load bearing surfaces to provide a lubricating separation of the two parts. Lubricating zones are provided comprising multiple radial oil outlet grooves and defining means for the zones. The radial grooves intersect at least some of the insert receiving grooves, and such grooves are constructed and arranged to feed lubricating oil into the area between the inserts and along the inserts for distrubution to the load bearing surfaces under pressure.

The invention will be better understood and additional objects and advantages will become apparent from the following description taken in connection with the accompanying drawings.

BRIEF DESCRIPTION OF THE DRAWINGS

FIG. 3 is an enlarged fragmentary cross sectional view taken on the line 3—3 of FIG. 2;

FIG. 4 is an enlarged fragmentary cross sectional view taken on the line 4—4 of FIG. 2 and showing lubricating oil pickup means;

FIG. 5 is an enlarged perspective view of a portion of the bearing surface and showing zone forming stops in such surface;

FIG. 6 is a sectional view taken on the line 6—6 of FIG. 5;

DETAILED DESCRIPTION OF A PREFERRED EMBODIMENT

The concept of the invention is illustrated herein in connection with a gyratory-type crusher but it is to be understood that the principles of the invention may be applied to any type of bearing surface wherein a surface bears a movable load receiving member in a lubricated support.

Figure 1:
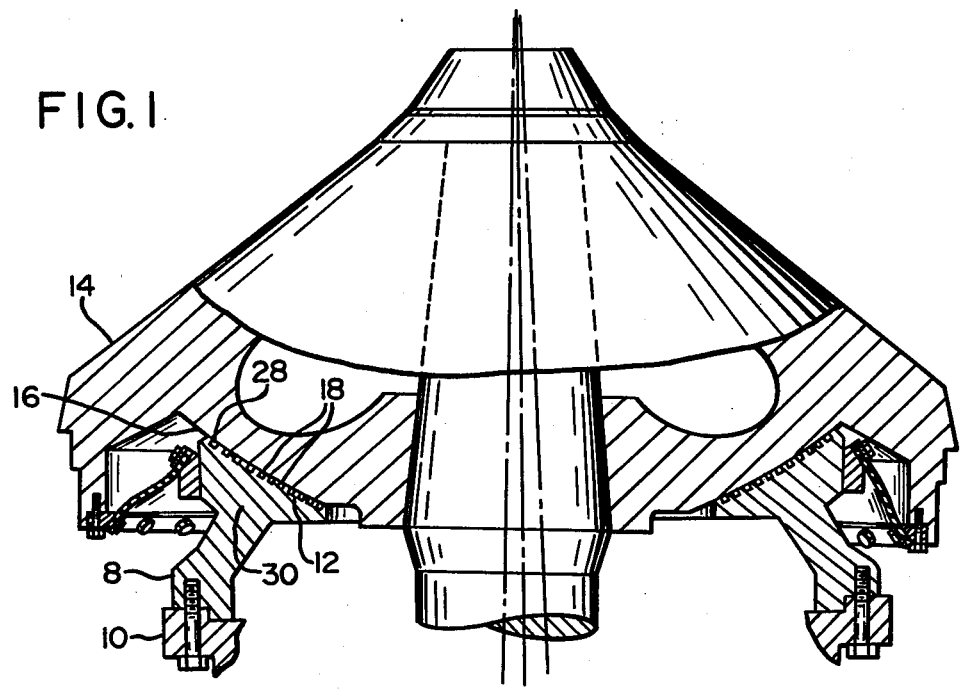
FIG. 1 is a fragmentary sectional view taken through load bearing surface of a gyratory rock crusher, this view showing a first form of the invention.
Figure 2:
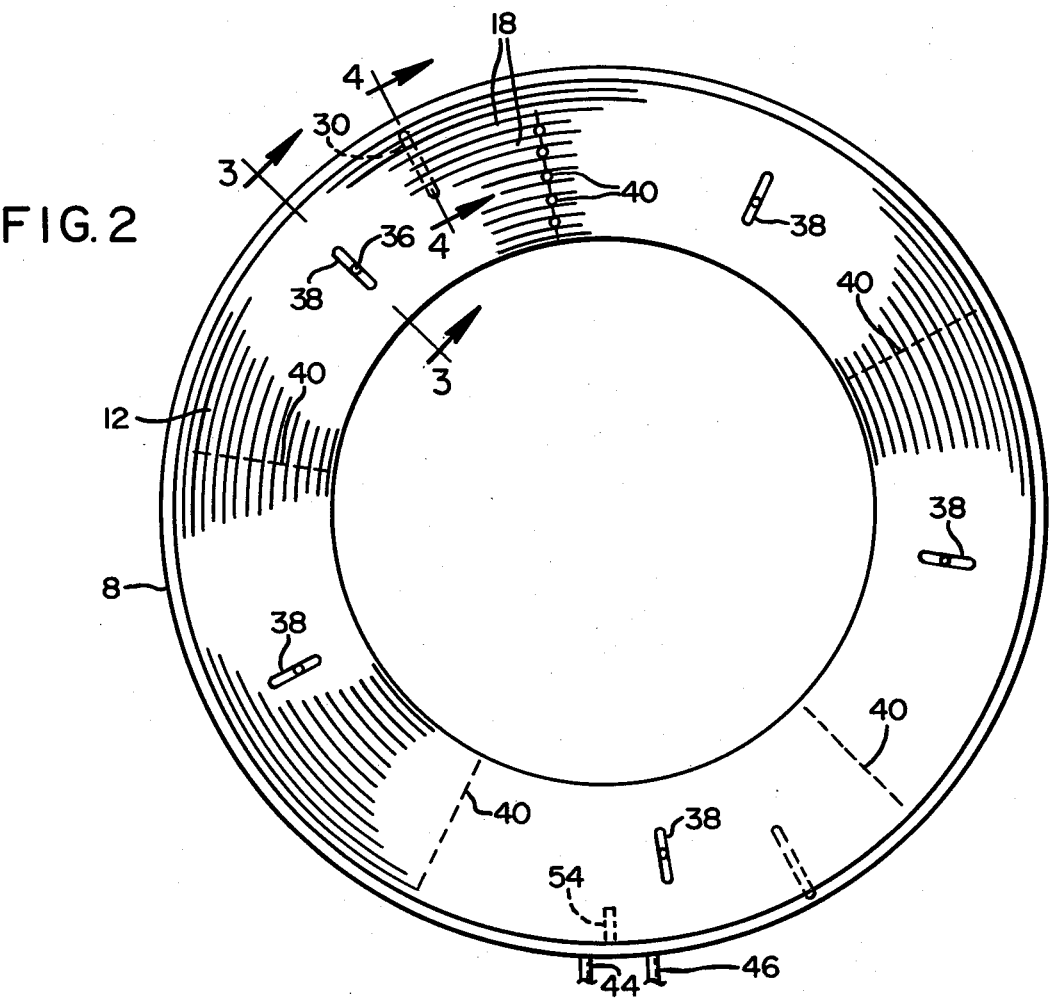
FIG. 2 is a plan view of a load bearing surface embodying features of the invention such as the lower bearing surface of the rock crusher of FIG. 1, a portion of this view being diagrammatic.

With particular reference to the drawings, and first to FIGS. 1 and 2, a gyratory rock crusher has a head support or thrust 8 having suitable support on a base frame 10. The head support 8 is annular in configuration and has an upper concaved or spherical surface 12 providing movable support for a gyrating head 14. The details of the head 14 are not illustrated in detail but such portion of the crusher has mechanical connection to eccentric means which produce the gyrating motion. Head 14 has a bottom convex surface 16 corresponding to the concaved shape of the surface 12.

According to the invention and as also seen in FIGS. 3-6 which illustrate a first form of the invention, the surface 12 is provided with a plurality of grooves 18 extending around the face in the annular pattern of the face and in parallel relation. The grooves are rectangular in cross section and have a flat bottom surface at right angles to the spherical radius of the surface 12. The innermost groove is disposed adjacent to the inner circumference of the head support 8, and succeeding grooves are provided up the surface 12 to a point short of the outer circumference of the head support.

Commercial size bars 20 of bronze, brass, plastic, or the like are inserted in the grooves 18 in a snug fit and are dimensioned to project above the surface 12 to serve as the bearing surface of the head support 8 against the bottom convex surface 16 of the head 14.

Additional annular grooves are provided in the surface 12 at the outer portion of the latter, comprising a first groove 24 arranged to receive an oil seal 26, a second groove or channel 28 communicating with one or more passageways 30, FIG. 4, leading to a central portion of the head support 8, and a third groove 32 receiving an oil and dust seal 34.

Also according to the invention fluid lubrication is supplied to the bearing surface between the bars 20 and the head 14, and such comprises a plurality of inlet passageways 36, FIG. 3, which lead through the head support 8 and terminate at the surface 12 in radial or cross grooves 38 cut in the surface 12. These grooves extend only through a portion of the transverse width of the surface 12 and the cut deeper than the grooves 18. Passageways 36 are connected by suitable means, not shown, to an oil pressure supply system, also not shown, of conventional structure. With reference to FIG. 3, oil under pressure from passageway 36 enters into cross grooves 38 and flows upwardly in the grooves to the space between the bars 20 and then it flows in opposite directions along the surface 12 between the bars. Further movement of the oil in a pressured lubrication will be described in greater detail hereinafter.

It is preferred that the lubrication arrangement be provided in zones around the bearing surface. For this purpose and as shown in FIG. 2, five of the cross grooves 38 are provided in equally spaced relation around the bearing surface. Each of such cross grooves has an oil inlet passageway 36. In order to form the individual zones for the oil, rows of inserts 40 are set between the defining walls of the grooves 18 halfway around the bearing surface between the grooves 38. This arrangement is shown in FIG. 2 with some of the rows of inserts 40 being shown diagrammatically. Inserts 40 are dimensioned such that each is the full width of the defining walls between the grooves 18 and the upper surface thereof is flush with the upper surface of the bars 20. With the upper surface of the inserts 40 in engagement with the bottom surface of head 14, oil under pressure entering through each cross groove 38 will flow in opposite directions along the grooves to the dams formed by the inserts 40.

According to the invention the source for the oil has an output sufficient to provide a pressure at least as great as the working pressure between the head 14 and the surface 12. The oil enters the cross grooves 38, and as stated it flows along the channels formed between the bars along the surface 12. The oil is stopped at the inserts 40, and because of the high pressure source, it lifts the head 14 and flows over the top of the bars 20. Oil moving toward the outer circumferential portion of the head support 8 is blocked by the high pressure seal 26, although any oil that may escape past this seal will enter drain channel 28 and be returned through passageway 30 to a reservoir, not shown, at the center of the head support. Seal 34 insures against any outward escape of oil or inlet of foreign material.

Since the outward escape of oil is restricted, oil which is forced over the bars can only escape toward the center to the reservoir. With sufficient pressure and volume being supplied by the source and one which is predetermined to provide movement of oil over the top of the bars even at the highest crushing pressures, a film of oil is always present to prevent metal to metal contact. The short length of the cross grooves 38 and their location in spaced relation from the inner oil escape area of the head support 8 provides a good distribution of oil over all the bars 20 and prevents oil from flowing merely to a nearest edge of escape.

With a constant pressure being imparted to the oil, the flow velocity will vary as the force or space between the two members 8 and 14 changes, and such arrangement insures positive lubrication between the parts. That is, when there is minimum pressure applied between the parts 10 and 14, such as when the head 14 is not crushing, the incoming oil only has to lift the head and the oil thus easily flows in its escape route over the bars 20 and inserts 40. Increasing pressure pushes the head 14 toward the bearing surface until a balance is reached between the skin friction of flowing oil and the imposed pressure, and the flowing oil thus fully covers the bearing surface. As the pressure increases between the parts 10 and 14, as when crushing, the lift distance between these parts is considerably less and the oil must therefore flow faster.

Head support 8 is provided with a circumferential water cooling passageway 42, FIG. 3, therein having inlet and outlet conduits 44 and 46, respectively, FIG. 2, and suitable connecting passageways 48, FIG. 3, between the conduits and the passageway 42. A dam 54 is provided between the inlet and outlet to insure that coolant flows fully around passageway 42. Passageway 42 preferably is formed in an outer surface portion of the head support 8 and is closed by a band 50 and seal members 52.

Figure 7:
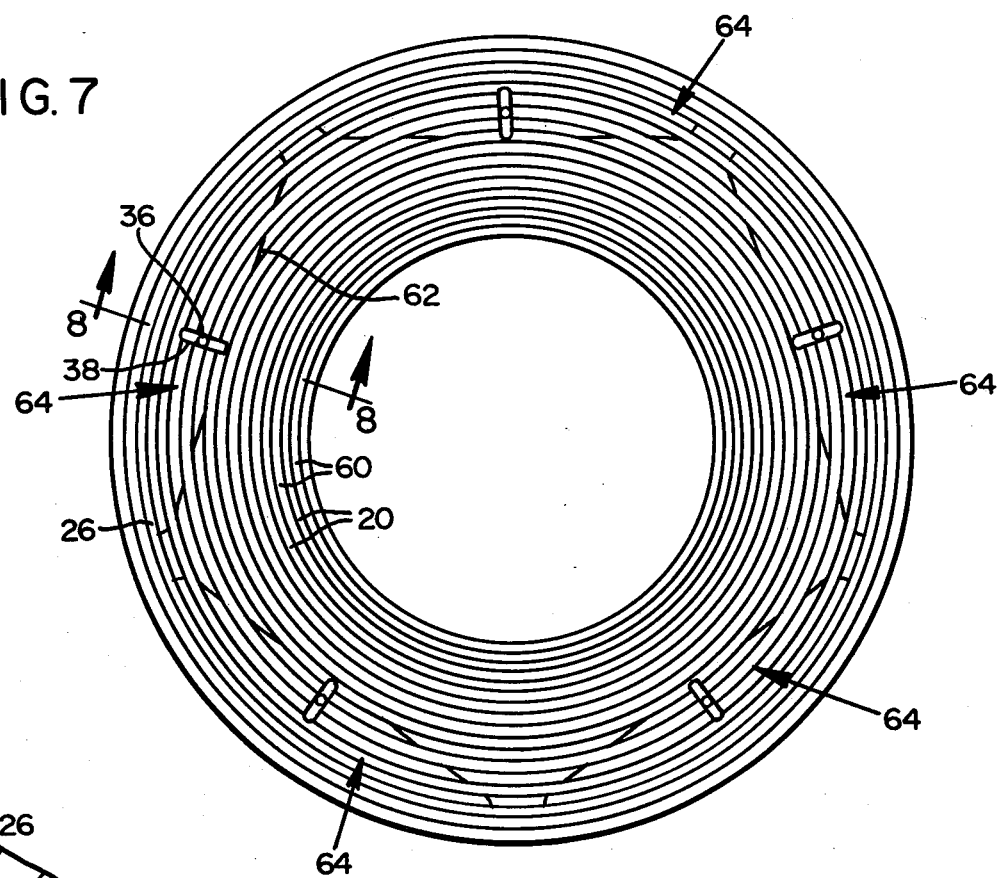
FIG. 7 is a plan view of a load bearing surface illustrating a second form of the invention.
Figure 8:
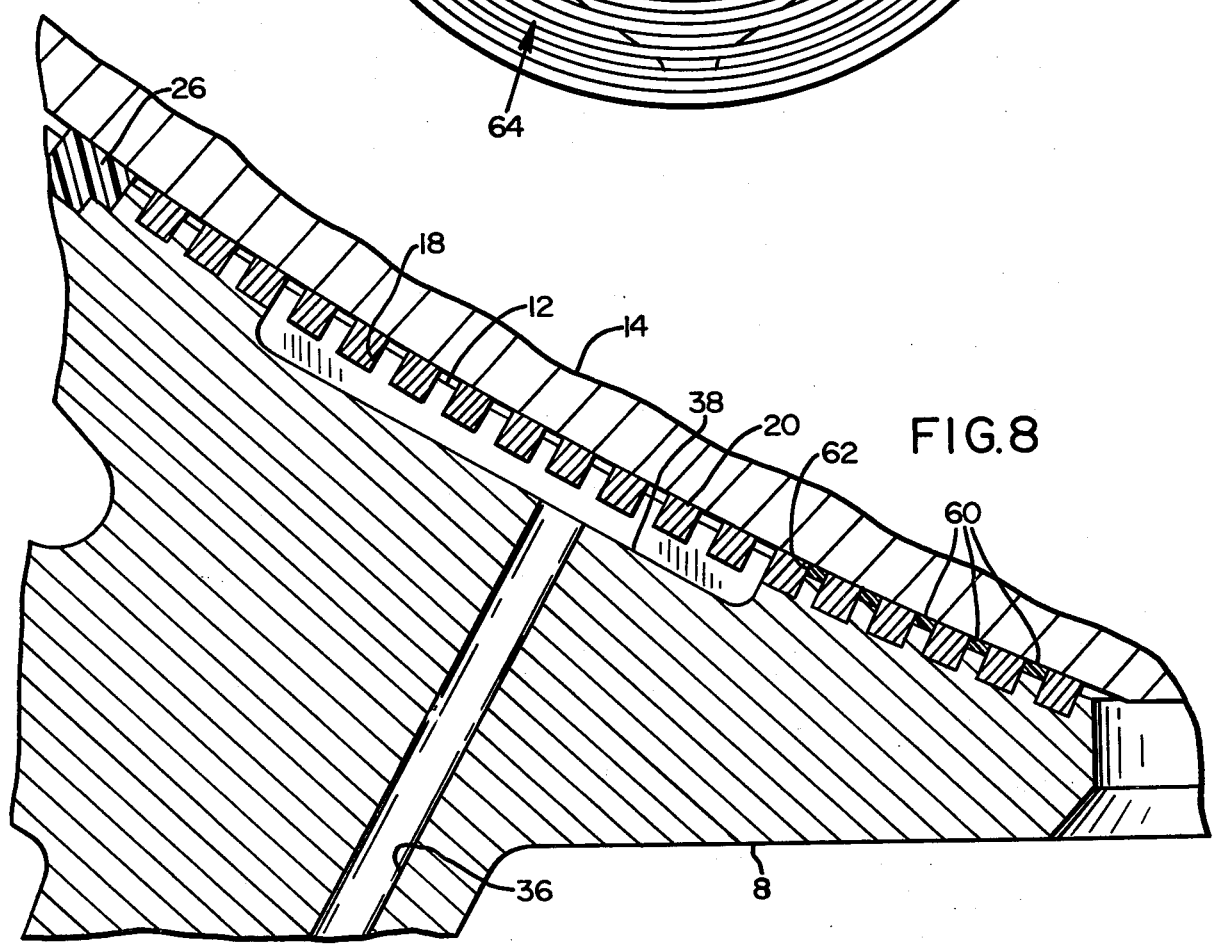
FIG. 8 is an enlarged fragmentary cross sectional view taken on the line 8—8 of FIG. 7.

A modification of the invention is shown in FIGS. 7 and 8. In this form of the invention bars 20 are similarly used with grooves 18 in the same arrangement as in the first embodiment. The structure of FIGS. 7 and 8 also has similar outer seals, multiple inlet passageways 36 and radial or cross oil outlet grooves 38. This modified structure employs multiple oil zones and also adds to the lubricating support between the two members 8 and 14 follows.

The spaces between the bars 20 above the surface 12 principally at the center of the latter are filled with epoxy 60. The epoxy filling has an outer boundary 62 which is inwardly toward the center from the radial oil outlet grooves 38 but extends to the outer seal 26. More particularly, the outer boundary 62 at each groove 38 is tangential to the grooves 18 and leads to the seal 26 in spaced relation from the boundaries associated with the adjacent grooves 38. By such arrangement individual oil distribution zones 64 are formed for each outlet groove 38.

In the operation of the structure of FIGS. 7 and 8, pressured oil from outlet grooves 38 flows laterally of the grooves in the spaces between the bars 20 above the surface 12 so as to distribute evenly in the areas 64. From such distribution zones, the oil lubricates in the same manner as described in connection with the first embodiment in that it provides a combined hydrostatic and hydrodynamic lubrication as it escapes toward the center. The zones 64 provide good distribution of the oil similar to that accomplished by the stops 40 in the first embodiment. The epoxy fillings 60 provide an extra bearing surface to increase the hydrodynamic area. Although the hydrostatic area is reduced, hydrostatic lift is still present over a substantial part of the epoxy area because oil under pressure is pushing oil in front of it as the oil flows to escape. The greater support area provided by the epoxy reduces the oil escape rate and thereby also reduces the volume of oil required.

The filling 60 may comprise a material other than epoxy but as required such must have long wearing capabilities. The lubricating quality may be increased by adding a lubricant to the filler material such as graphite. The shape and size of the oil distribution zones 64 may vary from that shown and described.

According to the invention, a bearing surface is provided that accomplishes efficient lubrication in all ranges of pressure loads. A hydrostatic and hydrodynamic lubrication is accomplished and one which is efficient and adequate in all phases of pressure. The formation of the bearing surface of the inention is inexpensive and in addition is easily repaired or replaced.

It is to be understood that the forms of our invention herein shown and described are to be taken as preferred examples of the same that various changes in the shape, size and arrangement of parts may be resorted to without departing from the spirit of our invention, or the scope or the subjoined claims.

Having thus described our invention, we claim:

1. A bearing assembly for supporting a movable load-receiving member comprising:

(a) a base member having a face surface arranged to face a load receiving member, (b) a plurality of grooves in said surface disposed in spaced relation to each other and defined by longitudinal wall portions therebetween of predetermined depth, (c) bearing inserts supported in said grooves being dimensioned to project beyond the depth of said grooves so that said inserts provide projecting portions extending from said grooves towards said load receiving member, (d) the projecting portions of said inserts terminating in load bearing surfaces arranged to be engaged by said load receiving member, (e) and lubrication means in said bearing assembly supplying a lubricating fluid to said bearing surfaces of said inserts.

2. The bearing assembly of claim 1 wherein said grooves extend in parallel relation to each other.

3. The bearing assembly of claim 1 wherein said face surface of said base member is annular in shape and also is radially concaved, said grooves extending along said face in parallel relation to each other.

4. The bearing assembly of claim 1 wherein said lubrication means includes pressure supply means arranged to admit lubricating oil to said load bearing surfaces at a pressure sufficient to overcome a load on said load bearing surfaces from a movable load-receiving member and move lubricating oil over said load bearing surfaces.

5. The bearing assembly of claim 1 wherein said face surface of said base member is annular in shape, said grooves extending along said face in parallel relation to each other, said lubrication means including pressure supply means and also including radial groove means intersecting at least some of said grooves for the inserts, said radial grooves means being deeper than said grooves for said inserts whereby to feed lubricating oil into the area between said inserts and along said inserts for distribution to said load bearing surfaces.

6. The bearing assembly of claim 1 wherein said face surface of said base member is annular in shape and is also radially concaved, said grooves extending along said face in parallel relation to each other, said lubrication means including pressure supply means arranged to admit lubricating oil to said load bearing surfaces at a pressure sufficient to overcome a load on said load bearing surfaces from a movable load-receiving member and move lubricating oil over said load bearing surfaces.

7. The bearing assembly of claim 1 wherein said face surface of said base member is annular in shape, said grooves extending along said face in parallel relation to each other, said lubrication means including pressure supply means and also including at least two radial grooves spaced around said face surface of said base member intersecting at least some of said grooves for the inserts, said radial groove means being deeper than said grooves for said inserts whereby to feed lubricating oil into the area between said inserts and along said inserts for distribution to said load bearing surfaces, stop means on said longitudinal wall portions stopping the flow of lubricating fluid between said inserts, said stop means being spaced from said radial grooves to form individual lubricating areas in said bearing assembly.

8. The bearing assembly of claim 1 wherein said face surface of said base member is annular in shape, said grooves extending along said face in parallel relation to each other, said lubrication means including pressure supply means and also including at least two radial grooves spaced around said face surface of said base member intersecting at least some of said grooves for the inserts, said radial groove means being deeper than said grooves for said inserts whereby to feed lubricating oil into the area between said inserts and along said inserts for distribution to said end bearing surfaces, stop means on said longitudinal wall portions stopping the flow of lubricating fluid between said inserts, said stop means being spaced from said radial grooves to form individual lubricating areas in said bearing assembly, said lubrication means including pressure supply means arranged to admit lubricating oil to each of said radial grooves to admit lubricating oil into said individual lubricating areas.

9. The bearing assembly of claim 8 wherein said pressure supply means is arranged to admit lubricating oil to said areas at a pressure sufficient to overcome a load on said load bearing surfaces from a movable load-receiving member and move lubricating oil over said load bearing surface.

10. The bearing assembly of claim 1 wherein said lubrication means includes pressure supply means, said assembly also including radial groove means intersecting at least some of said grooves for the inserts, said radial groove means being deeper than said grooves for said inserts whereby to feed lubricating oil into the areas between said inserts and along said inserts for distribution to said load bearing surfaces, and a plastic filler in some of the areas between said inserts to also form a load bearing surface.

11. The bearing assembly of claim 1 wherein said lubrication means includes pressure supply means, said assembly also including radial groove means intersecting at least some of said grooves for the inserts, said radial groove means being deeper than said grooves for said inserts whereby to feed lubricating oil into the area between said inserts and along said inserts for distribution to said load bearing surfaces, and a plastic filler in said areas between said inserts to also form a load bearing surface, said plastic filler having an outer boundary defining oil distribution zones around said radial groove means.

12. The bearing assembly of claim 1 wherein said base member comprises a rock crusher base, and a head comprising the load receiving member movable in a gyratory motion on said load bearing surfaces of said bearing inserts.

* * * * *